United States Patent
Nakamura et al.

(10) Patent No.: US 10,086,541 B2
(45) Date of Patent: Oct. 2, 2018

(54) METHOD FOR MANUFACTURING SEAT PAD

(71) Applicant: TOYO TIRE & RUBBER CO., LTD., Osaka-shi, Osaka (JP)

(72) Inventors: Haruo Nakamura, Osaka (JP); Takashi Sakazume, Osaka (JP); Yu Sasaki, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 981 days.

(21) Appl. No.: 14/535,991

(22) Filed: Nov. 7, 2014

(65) Prior Publication Data

US 2015/0137405 A1    May 21, 2015

(30) Foreign Application Priority Data

Nov. 19, 2013   (JP) ................................ 2013-238550

(51) Int. Cl.
| | |
|---|---|
| *B29C 44/00* | (2006.01) |
| *B29C 44/08* | (2006.01) |
| *B29L 9/00* | (2006.01) |
| *B29L 31/58* | (2006.01) |
| *B29L 31/00* | (2006.01) |
| *B29K 75/00* | (2006.01) |
| *B29K 105/04* | (2006.01) |
| *B29K 105/08* | (2006.01) |

(52) U.S. Cl.
CPC ........ *B29C 44/086* (2013.01); *B29K 2075/00* (2013.01); *B29K 2105/04* (2013.01); *B29K 2105/0809* (2013.01); *B29L 2009/00* (2013.01); *B29L 2031/58* (2013.01); *B29L 2031/771* (2013.01)

(58) Field of Classification Search
CPC .............................. B29C 44/12; B29C 44/086
USPC ....................................................... 264/46, 4
See application file for complete search history.

(56) References Cited

U.S. PATENT DOCUMENTS 4,923,653 A * 5/1990 Matsuura .............. B29C 44/086
                                                    264/40.3

FOREIGN PATENT DOCUMENTS

| CN | 102729380 A | 10/2012 |
|---|---|---|
| JP | 2006-14829 A | 1/2006 |

OTHER PUBLICATIONS

Office Action dated Sep. 20, 2016, issued in counterpart Chinese Application No. 201410589948.5, with English translation. (13 pages).

* cited by examiner

*Primary Examiner* — Christina A Johnson
*Assistant Examiner* — Xue H Liu
(74) *Attorney, Agent, or Firm* — Westerman, Hattori, Daniels & Adrian, LLP (57) ABSTRACT

A pad main body is bonded integrally with an inner pad while covering the front side of the inner pad. A back-side reinforced fabric located on the back side of the pad main body and the inner pad is integrally bonded on the back side of the inner pad and the pad main body by impregnation of foamed synthetic resin materials constituting the inner pad and the pad main body. This allows impregnation of the foamed synthetic resin materials in the back-side reinforced fabric located on the back side of the inner pad and the pad main body. This consequently allows providing a high hardness on the back side of the inner pad while ensuring hardness on the back side of the pad main body.

2 Claims, 8 Drawing Sheets

METHOD FOR MANUFACTURING SEAT PAD

TECHNICAL FIELD

The present invention relates to a method for manufacturing a seat pad.

BACKGROUND ART

Figure 8A:
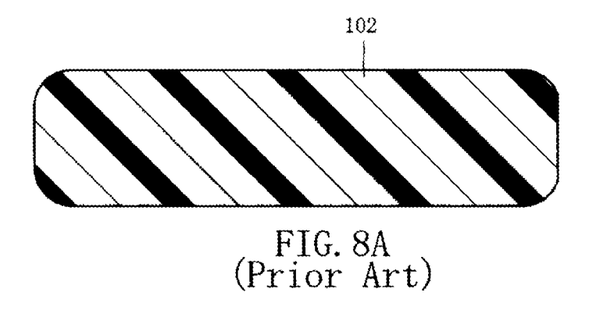
FIG. 8A is a cross-sectional view of an inner pad, which constitutes a part of a conventional seat pad.
Figure 8B:
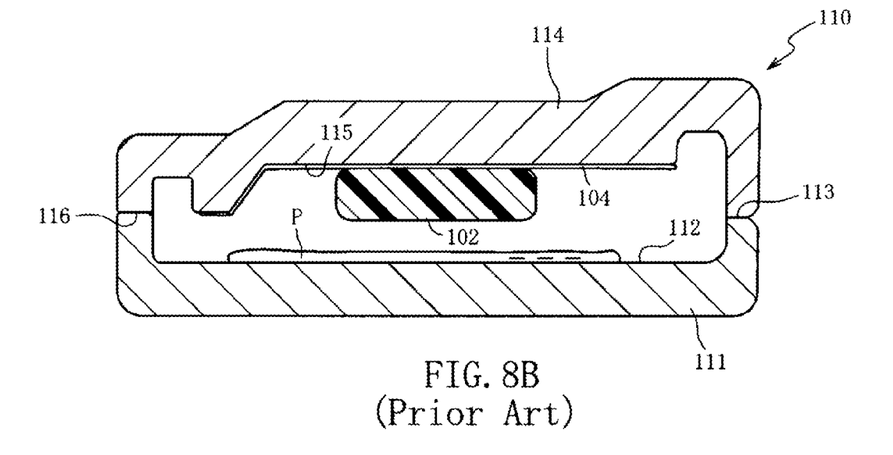
FIG. 8B is a cross-sectional view of a molding die where a pad main body is to be foam molded.
Figure 8C:
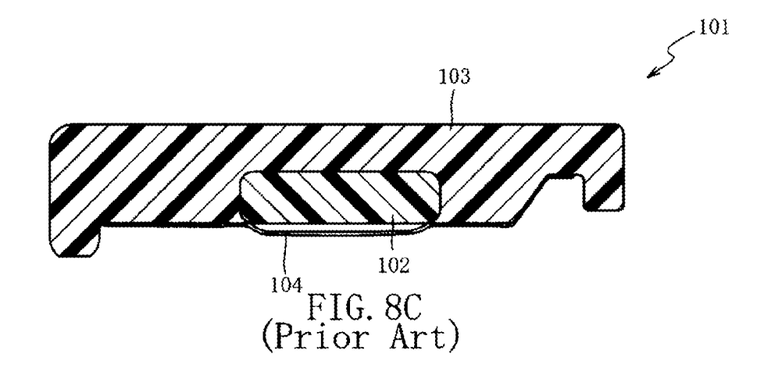
FIG. 8C is a cross-sectional view of the seat pad foam molded integrally with a back-side reinforced fabric.

In some seat pad used for a seat equipped with transportation such as a vehicle, a ship, and an aircraft, for a chair of furniture or similar chair, and the like, an inner pad and a pad main body, which have mutually different characteristics, are integrally foam molded (for example, Patent Literature 1). A description will be given of a conventional seat pad 101 disclosed in Patent Literature 1 with reference to FIGS. 8A-C. FIG. 8A is a cross-sectional view of an inner pad 102, which constitutes a part of the conventional seat pad 101. FIG. 8B is a cross-sectional view of a molding die 110 where a pad main body 103 is to be foam molded. FIG. 8C is a cross-sectional view of the seat pad 101 foam molded integrally with a back-side reinforced fabric 104. The following describes the seat pad 101 to be used in a seat for an automobile.

As illustrated in FIG. 8A, the seat pad 101 is a flexible pad arranged between a seat spring and an epidermis material (neither of which is illustrated). The seat spring is disposed in a vehicle body of the automobile. The seat pad 101 is constituted to include the inner pad 102 (synthetic resin foam) made of foamed synthetic resin, the pad main body 103 (synthetic resin foam) made of foamed synthetic resin, and the back-side reinforced fabric 104 such as a nonwoven fabric. The pad main body 103 covers the front side (the upper side in FIG. 8C) of the inner pad 102. The back-side reinforced fabric 104 is arranged on the back side of the pad main body 103 and the inner pad 102.

Both the inner pad 102 and the pad main body 103 are formed of a flexible foam made of synthetic resin, for example, a flexible polyurethane foam or a semi-rigid polyurethane foam, and are set to have mutually different characteristics. The back-side reinforced fabric 104 is a seat pad member that is constituted of a nonwoven fabric (such as a hair felt) or similar material and that is integrally foamed. When the seat pad 101 is used in a seat for an automobile, the back-side reinforced fabric 104 is interposed between: a seat spring and a seat component (neither of which is illustrated); and the inner pad 102 and the pad main body 103.

The following describes a method for manufacturing the seat pad 101. Firstly, as illustrated in FIG. 8A, the inner pad 102 foam molded by a molding die (not illustrated) is prepared. Subsequently, as illustrated in FIG. 8B, the back-side reinforced fabric 104 and the inner pad 102 are mounted by a magnet, a pin, or similar method within the molding die 110 for foam molding the pad main body 103.

Here, the molding die 110 is constituted to include a lower die 111 and an upper die 114. The lower die 111 is a member in approximately a box shape whose top portion is opened. In the lower die 111, a molding surface 112 is formed. The molding surface 112 molds the front side of the pad main body 103. At the peripheral edge of the molding surface 112, a parting surface 113 is formed. The upper die 114 is a member formed in a lid shape that can seal the molding surface 112 of the lower die 111. At the peripheral edge of a molding surface 115, which molds the back side of the pad main body 103, a parting surface 116 is formed. The parting surface 116 becomes the matching surface with the lower die 111.

The back-side reinforced fabric 104 is mounted on the molding surface 115 of the upper die 114 constituted as described above. The inner pad 102 is mounted on the upper die 114 to be overlapped with the back-side reinforced fabric 104. A foamed synthetic resin material P (liquid raw material), which is a raw material of the pad main body 103, is injected into the lower die 111. The parting surfaces 113 and 116 are matched for closing the dies. Subsequently, the foamed synthetic resin material P is foamed. After curing for a predetermined time, the dies are opened to demold the molded seat pad 101.

When the pad main body 103 is foam molded, the foamed synthetic resin material P is impregnated in the back-side reinforced fabric 104 and the front side of the inner pad 102. Accordingly, the pad main body 103 is bonded integrally with the back-side reinforced fabric 104 and the front side of the inner pad 102. The back-side reinforced fabric 104, which is hardened by impregnation of the foamed synthetic resin material P, has a high hardness. Thus, the back-side reinforced fabric 104 becomes a receiving member for the seat spring and the seat component (neither of which is illustrated).

CITATION LIST

Patent Literature

[Patent Literature 1] JP-A No. 2006-14829 (especially in paragraph [0038])

SUMMARY OF INVENTION

Technical Problem

However, while the above-described conventional technique can provide a high hardness on the back side of the pad main body, the foamed synthetic resin material is not impregnated in the back-side reinforced fabric located on the back side of the inner pad. Thus, the hardness on the back side of the inner pad cannot be high. Therefore, the back-side reinforced fabric on the back side of the flexible inner pad has friction with the seat spring and the seat component. This has sometimes caused ripping of the back-side reinforced fabric or breakage of the back side of the inner pad.

The present invention has been made to address the above problem, and it is an object of the present invention to provide a method for manufacturing a seat pad that can provide a high hardness on the back side of an inner pad while ensuring hardness on the back side of a pad main body.

Solution to Problem and Advantageous Effects of Invention

To achieve this object, with the method for manufacturing the seat pad according to a first aspect, a reinforced-fabric mounting step mounts a back-side reinforced fabric within a molding die where an inner pad made of foamed synthetic resin is to be foam molded. An inner-pad molding step foam molds the inner pad integrally with the back-side reinforced fabric. This allows bonding the back-side reinforced fabric and the back side of the inner pad. Subsequently, an inner-pad mounting step mounts the inner pad and the back-side reinforced fabric within a molding die where a pad main body made of foamed synthetic resin is to be foam molded.

The inner pad and the back-side reinforced fabric are integrally foam molded by the inner-pad molding step. The pad main body is set to have a characteristic different from a characteristic of the inner pad. A pad-main-body molding step foam molds the pad main body integrally with the inner pad and the back-side reinforced fabric. The inner pad and the back-side reinforced fabric are mounted by the inner-pad mounting step. This allows also bonding the back-side reinforced fabric on the back side of the pad main body. This consequently provides an effect that allows providing a high hardness on the back side of the inner pad while ensuring hardness on the back side of the pad main body.

With the method for manufacturing the seat pad according to a second aspect, the molding die where the inner pad is to be foam molded includes a lower die and an upper die configured to seal the lower die. The lower die forms a molding surface for molding the front side of the inner pad. In the upper die, a molding surface for molding the back side of the inner pad is formed. The reinforced-fabric mounting step mounts the back-side reinforced fabric in a folded state on the molding surface of the upper die on the inside of parting surfaces of the upper die and the lower die. The inner-pad mounting step mounts the back-side reinforced fabric and the inner pad in a state where the fold is opened within the molding die where the pad main body is to be foam molded. This allows bonding one sheet of the back-side reinforced fabric where the fold is opened on the back side of the inner pad and the pad main body, thus providing an effect that allows reducing the product cost compared with the case where a plurality of the back-side reinforced fabrics is used in addition to the effect of the first aspect.

With the method for manufacturing the seat pad according to a third aspect, the molding die where the inner pad is to be foam molded includes a reinforced-fabric housing portion recessed on the molding surface of the upper die. The reinforced-fabric housing portion houses the back-side reinforced fabric in a folded state. The back-side reinforced fabric increases in thickness by being folded. Accordingly, mounting the folded back-side reinforced fabric on the molding surface of the upper die reduces the distance between the molding surface of the lower die, into which the foamed synthetic resin material (liquid raw material) of the inner pad is injected, and the back-side reinforced fabric. The reduction of the distance might cause reduction in thickness of the inner pad, thus making it difficult to achieve a required performance.

In response, the reinforced-fabric housing portion, which houses the back-side reinforced fabric in a folded state, is disposed on the molding surface of the upper die. This allows housing the back-side reinforced fabric with an increased thickness. This provides an effect that can facilitate ensuring the required thickness of the inner pad in addition to the effect of the second aspect.

With the method for manufacturing the seat pad according to a fourth aspect, the molding die where the inner pad is to be foam molded includes a lower die and an upper die configured to seal the lower die. The lower die forms a molding surface for molding the front side of the inner pad. In the upper die, a molding surface for molding the back side of the inner pad is formed. The reinforced-fabric mounting step sandwiches the back-side reinforced fabric between parting surfaces of the upper die and the lower die. The inner-pad mounting step mounts the back-side reinforced fabric and the inner pad within the molding die where the pad main body is to be foam molded. This allows bonding one sheet of the back-side reinforced fabric sandwiched between the parting surfaces on the back side of the inner pad and the pad main body. This consequently provides an effect that allows reducing the product cost compared with the case where a plurality of the back-side reinforced fabrics is used in addition to the effect of claim 1 the first aspect.

Furthermore, the raw material of the foamed inner pad is impregnated in the back-side reinforced fabric on the inside of the parting surfaces but cannot be impregnated on the peripheral edge side of the back-side reinforced fabric located on the outside of the parting surfaces. This allows preventing the peripheral edge side of the back-side reinforced fabric from being bonded on the back side of the inner pad. If the peripheral edge side of the back-side reinforced fabric is bonded on the back side of the inner pad, there occurs the need for ripping the peripheral edge side of the back-side reinforced fabric from the back side of the inner pad before the back-side reinforced fabric and the inner pad are mounted on the upper die by the inner-pad mounting step. In this case, the working efficiency of the mounting operation of the back-side reinforced fabric and the inner pad by the inner-pad mounting step is reduced. In response, bonding of the peripheral edge side of the back-side reinforced fabric on the back side of the inner pad can be avoided. This provides an effect that allows ensuring the working efficiency of the mounting operation of the back-side reinforced fabric and the inner pad by the inner-pad mounting step.

BRIEF DESCRIPTION OF DRAWINGS

FIG. 2B is a cross-sectional view of a molding die for an inner pad where the inner pad is foam molded in a state where the die is opened.

DESCRIPTION OF EMBODIMENTS

Figure 1A:
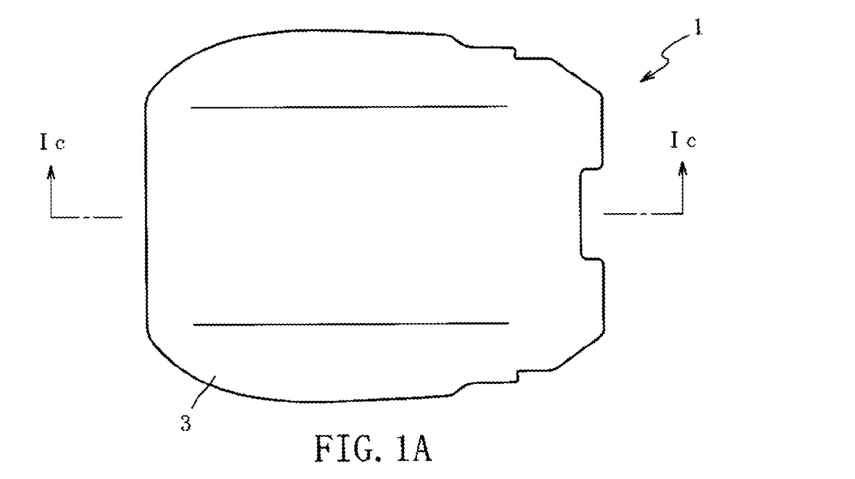
FIG. 1A is a top view of a seat pad in a first embodiment.
Figure 1B:
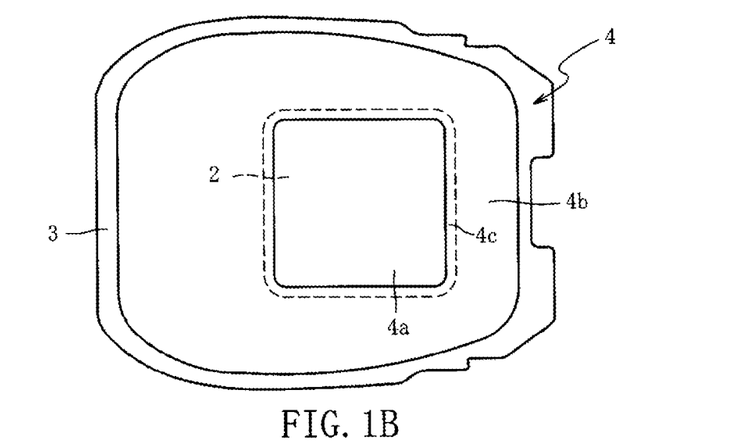
FIG. 1B is a back view of the seat pad.
Figure 1C:
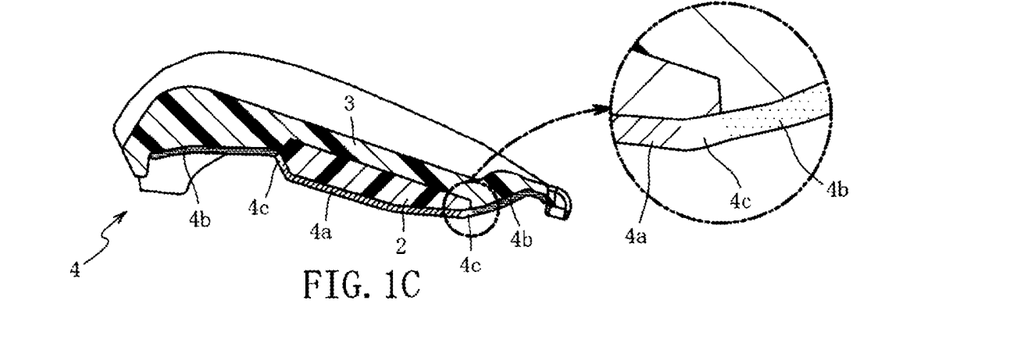
FIG. 1C is a cross-sectional view of the seat pad taken along the line Ic-Ic in FIG. 1A.

Hereinafter, a description will be given of preferred embodiments of the present invention with reference to the accompanying drawings. Firstly, a description will be given of a seat pad 1 in a first embodiment with reference to FIGS. 1A-C. FIG. 1A is a top view of the seat pad 1 in the first embodiment. FIG. 1B is a back view of the seat pad 1. FIG. 1C is a cross-sectional view of the seat pad 1 taken along the line Ic-Ic in FIG. 1A. The seat pad 1 is a flexible pad arranged between a seat spring and an epidermis material (neither of which is illustrated), and constitutes a cushion pad on which an occupant sits. The seat pad 1 is constituted to include an inner pad 2 made of foamed synthetic resin, a pad main body 3 made of foamed synthetic resin, and a back-side reinforced fabric 4 such as a nonwoven fabric. The inner pad 2 is formed in approximately a rectangular shape in a back view. The pad main body 3 is arranged to cover the front side (the upper side in FIG. 1C) of the inner pad 2. The back-side reinforced fabric 4 is arranged on the back side of the pad main body 3 and the inner pad 2.

Both the inner pad 2 and the pad main body 3 are formed of a flexible foam made of synthetic resin, for example, a flexible polyurethane foam or a semi-rigid polyurethane foam, and are set to have mutually different characteristics. For example, to improve the comfort during seating, the pad main body 3 on the surface is constituted of a flexible material. The inner pad 2 on the back side of the pad main body 3 is constituted of a material with a relatively large hardness to ensure rigidity. In this embodiment, the inner pad 2 is arranged under the seated person's bottom.

The back-side reinforced fabric 4 is a sheet material formed of a nonwoven fabric (such as a hair felt) or similar material. When the seat pad 1 is used in a seat for an automobile, the back-side reinforced fabric 4 is interposed between: a seat spring and a seat component (neither of which is illustrated); and the inner pad 2 and the pad main body 3. As illustrated in FIG. 1C, in the back-side reinforced fabric 4, an impregnated layer 4a, an impregnated layer 4b, and a non-impregnated layer 4c are formed. In the impregnated layer 4a, a foamed synthetic resin material (liquid raw material) constituting the inner pad 2 is impregnated and hardened. In the impregnated layer 4b, a foamed synthetic resin material (liquid raw material) constituting the pad main body 3 is impregnated and hardened. In the non-impregnated layer 4c, none of the foamed synthetic resin materials constituting the inner pad 2 and the pad main body 3 is impregnated.

The impregnated layer 4a is a portion where the back-side reinforced fabric 4 is integrally bonded on the back side of the inner pad 2. The impregnated layer 4b is a portion where the back-side reinforced fabric 4 is integrally bonded on the back side of the pad main body 3. The non-impregnated layer 4c is a portion formed with a predetermined small width over the whole circumference of the peripheral edge on the back side of the inner pad 2 from the peripheral edge toward the inside. In the non-impregnated layer 4c, the foamed synthetic resin material is not impregnated. Thus, the non-impregnated layer 4c is not bonded on the back side of the inner pad 2. On the other hand, the impregnated layers 4a and 4b have high hardnesses due to hardening of the foamed synthetic resin materials. Accordingly, the impregnated layers 4a and 4b are preferred as receiving members for the seat spring and the seat component (neither of which is illustrated). The impregnated layers 4a and 4b are formed on the back side of the inner pad 2 and the pad main body 3. This allows providing a high hardness on the back side of the inner pad 2 while ensuring hardness on the back side of the pad main body 3.

Figure 2A:
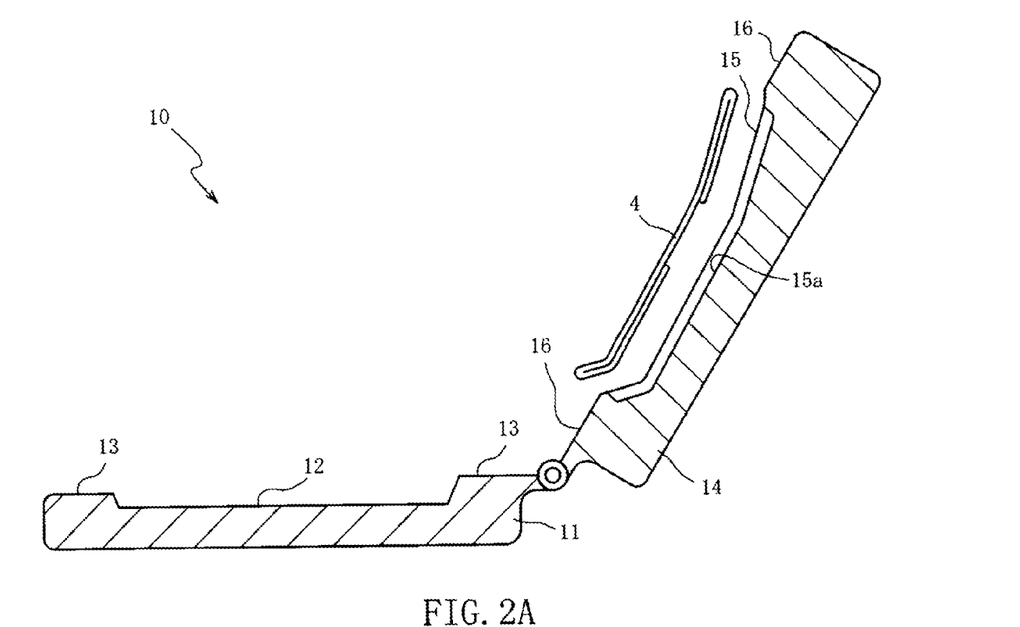
Figure 2B:
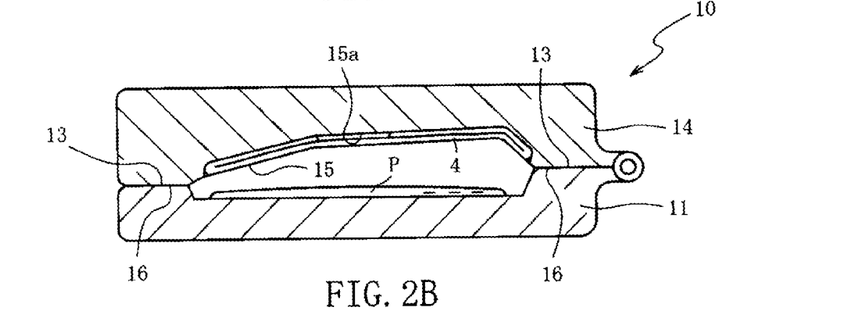
FIG. 2B is a cross-sectional view of the molding die for the inner pad in a state where the die is closed.
Figure 2C:
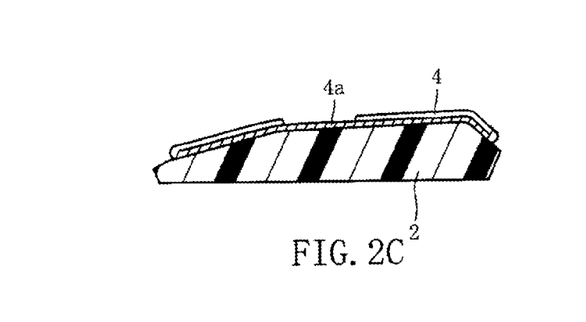
FIG. 2C is a cross-sectional view of the inner pad foam molded integrally with a back-side reinforced fabric.

The following describes a method for manufacturing the seat pad 1 with reference to FIGS. 2A-C to FIG. 4. Firstly, a description will be given of a molding die 10 where the inner pad 2 is to be foam molded and the method for manufacturing the inner pad 2 with reference to FIGS. 2A-C. FIG. 2A is a cross-sectional view of the molding die 10 for the inner pad 2 where the inner pad 2 is to be foam molded in a state where the die is opened. FIG. 2B is a cross-sectional view of the molding die 10 for the inner pad 2 in a state where the die is closed. FIG. 2C is a cross-sectional view of the inner pad 2 foam molded integrally with the back-side reinforced fabric 4.

As illustrated in FIG. 2A, the molding die 10 is constituted to include a lower die 11 and an upper die 14. The lower die 11 is a member in approximately a box shape whose top portion is opened. In the lower die 11, a molding surface 12 is formed. The molding surface 12 molds the front side of the inner pad 2. At the peripheral edge of the molding surface 12, a parting surface 13 is formed. The upper die 14 is a member formed in a lid shape that can seal the molding surface 12 of the lower die 11. At the peripheral edge of a molding surface 15, which molds the back side of the inner pad 2, a parting surface 16 is formed. The parting surface 16 becomes the matching surface with the lower die 11.

The upper die 14 has a reinforced-fabric housing portion 15a recessed on the molding surface 15 (on the inside of the parting surface 16). The reinforced-fabric housing portion 15a is a recess housed in a state where the back-side reinforced fabric 4 is folded. The reinforced-fabric housing portion 15a is set to have a size (area) equal to or less than the size (area) of the molding surface 15 and set to have a depth in approximately the same size as the thickness of the folded back-side reinforced fabric 4. The reinforced-fabric housing portion 15a includes a locking portion (not illustrated) such as a hook of a hook-and-loop fastener in the bottom portion. The back-side reinforced fabric 4 is locked by the locking portion so as to mount the back-side reinforced fabric 4 on the reinforced-fabric housing portion 15a.

Here, the locking portion is not limited to the hook-and-loop fastener. A small sheet of magnetic material may be mounted on a part of the back-side reinforced fabric 4 so as to implant a magnet, which attracts the sheet, in the upper die 14. In this case, the magnet corresponds to the locking portion.

When the seat pad 1 is manufactured, firstly, the inner pad 2 is foam molded using the molding die 10. In this case, in a state where the upper die 14 is opened with respect to the lower die 11, the back-side reinforced fabric 4 is mounted on the reinforced-fabric housing portion 15a formed in the upper die 14. Here, the back-side reinforced fabric 4 is set to be larger than the size of the inner pad 2 in a back view, and is set to have the size approximately same as the size of the pad main body 3 (see FIG. 1B) in a back view. The back-side reinforced fabric 4 is set to be larger than the size of the reinforced-fabric housing portion 15a. Accordingly, in a folded state, the back-side reinforced fabric 4 is mounted on the reinforced-fabric housing portion 15a such that the peripheral edge side is in contact with the bottom portion of the reinforced-fabric housing portion 15a and that the center side faces the inside of the molding die 10.

Subsequently, as illustrated in FIG. 2B, a foamed synthetic resin material P (liquid raw material), which is a raw material of the inner pad 2, is injected into the lower die 11. After the parting surfaces 13 and 16 are matched for closing the dies, the foamed synthetic resin material P is foam molded. After curing for a predetermined time, the dies are opened to demold the molded inner pad 2. As a result, as illustrated in FIG. 2C, the impregnated layer 4a by impregnating and hardening the foamed synthetic resin material in the back-side reinforced fabric 4 is formed. The impregnated layer 4a integrally bonds the back-side reinforced fabric 4 on the back side of the inner pad 2.

Figure 3:
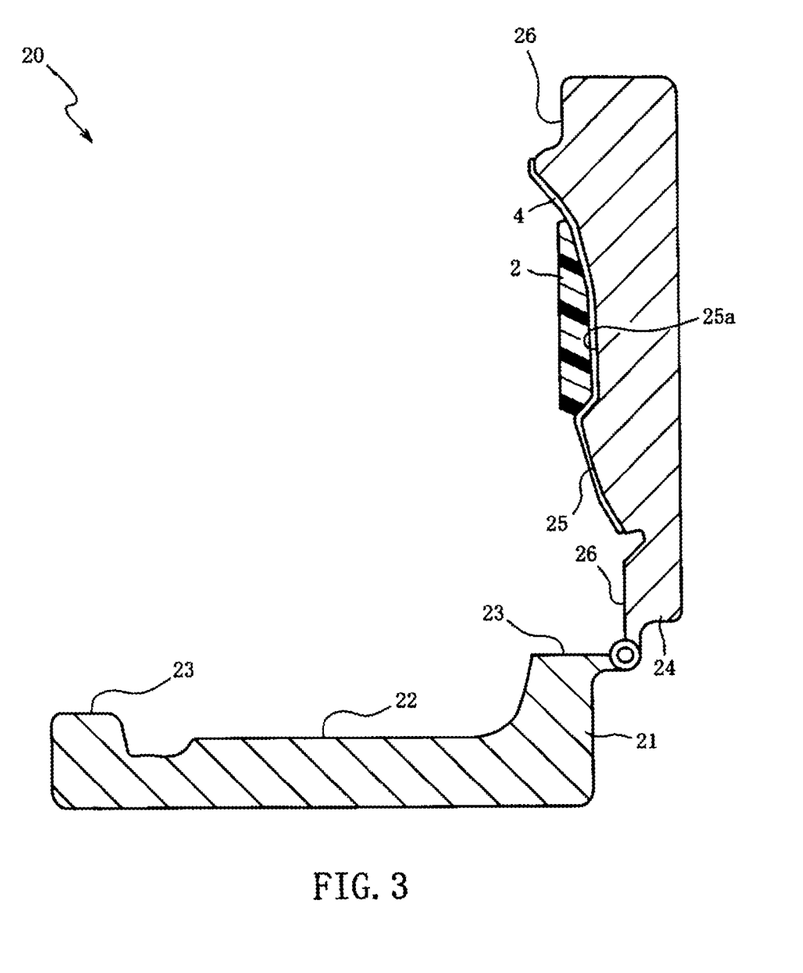
FIG. 3 is a cross-sectional view of a molding die for a pad main body where the pad main body is to be foam molded in a state where the die is opened.
Figure 4:
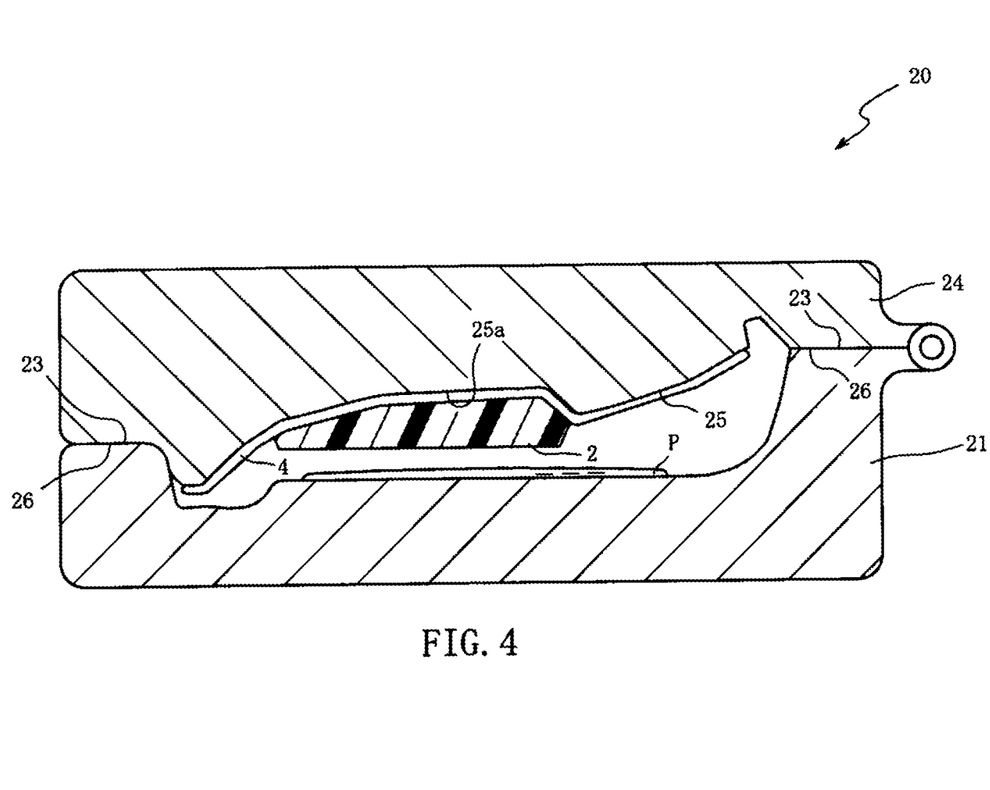
FIG. 4 is a cross-sectional view of the molding die for the pad main body in a state where the die is closed.

The following describes a molding die 20, where the pad main body 3 is to be foam molded, and a method for manufacturing the pad main body 3 with reference to FIG. 3 and FIG. 4. FIG. 3 is a cross-sectional view of the molding die 20 for the pad main body 3 where the pad main body 3 is to be foam molded in a state where the die is opened. FIG. 4 is a cross-sectional view of the molding die 20 for the pad main body 3 in a state where the die is closed.

As illustrated in FIG. 3, the molding die 20 is constituted to include a lower die 21 and an upper die 24. The lower die 21 is a member in approximately a box shape whose top portion is opened. In the lower die 21, a molding surface 22 is formed. The molding surface 22 molds the front side of the pad main body 3. At the peripheral edge of the molding surface 22, a parting surface 23 is formed. The upper die 24 is a member formed in a lid shape that can seal the molding surface 22 of the lower die 21. At the peripheral edge of a molding surface 25, which molds the back side of the pad main body 3, a parting surface 26 is formed. The parting surface 26 becomes the matching surface with the lower die 21.

The upper die 24 has an inner-pad securing portion 25a recessed on the molding surface 25. The inner-pad securing portion 25a is a portion where the inner pad 2 bonded integrally with the back-side reinforced fabric 4 is secured. In the inner-pad securing portion 25a, a locking portion such as a pin is disposed to protrude from the molding surface 25. Locking the inner pad 2 with the locking portion allows mounting the inner pad 2 and the back-side reinforced fabric 4 on the upper die 14.

When the pad main body 3 is molded using the molding die 20, firstly, in a state where the upper die 24 is opened with respect to the lower die 21, the inner pad 2 bonded integrally with the back-side reinforced fabric 4 is mounted on the inner-pad securing portion 25a formed in the upper die 24. At this time, in a state where the fold is opened, the back-side reinforced fabric 4 is mounted on the molding surface 25 of the upper die 24. The inner pad 2 is disposed on the inside of the molding die 20 with respect to the back-side reinforced fabric 4.

Subsequently, as illustrated in FIG. 4, the foamed synthetic resin material P (liquid raw material), which is a raw material of the pad main body 3, is injected into the lower die 21. After the parting surfaces 23 and 26 are matched for closing the dies, the foamed synthetic resin material P is foam molded. After curing for a predetermined time, the dies are opened to demold the molded pad main body 3. As a result, the impregnated layer 4b by impregnating and hardening the foamed synthetic resin material in the back-side reinforced fabric 4 (see FIG. 1C) is formed. The impregnated layer 4b integrally bonds the back-side reinforced fabric 4 on the back side of the pad main body 3. Accordingly, the back-side reinforced fabric 4 can also be bonded on the back side of the pad main body 3. This consequently allows providing a high hardness on the back side of the inner pad 2 while ensuring hardness on the back side of the pad main body 3.

When the inner pad 2 is foam molded, the back-side reinforced fabric 4 is mounted on the molding surface 15 of the upper die 14 in the folded state. When the pad main body 3 is foam molded, the back-side reinforced fabric 4 and the inner pad 2 are mounted on the molding surface 25 of the upper die 24 in the state where the fold is opened. After the foam molding, one sheet of the back-side reinforced fabric 4 where the fold is opened is bonded on the back side of the inner pad 2 and the pad main body 3. This allows reducing the product cost compared with the case where a plurality of the back-side reinforced fabrics 4 is used.

The molding die 10 where the inner pad 2 is to be foam molded includes the reinforced-fabric housing portion 15a recessed on the molding surface 15 of the upper die 14. The back-side reinforced fabric 4 is housed in the reinforced-fabric housing portion 15a in the folded state. The back-side reinforced fabric 4 increases in thickness by being folded. Accordingly, mounting the folded back-side reinforced fabric 4 on the molding surface 15 of the upper die 14 reduces the distance between the molding surface 12 of the lower die 11, into which the foamed synthetic resin material (liquid raw material) of the inner pad 2 is injected, and the back-side reinforced fabric 4. The reduction of the distance might cause reduction in thickness of the inner pad 2, thus making it difficult to achieve a required performance. To prevent this situation, the reinforced-fabric housing portion 15a, which houses the back-side reinforced fabric 4 in a folded state, is disposed on the molding surface 15 of the upper die 14. This can facilitate ensuring the thickness of the inner pad 2 compared with the case where the reinforced-fabric housing portion 15a is not formed.

Here, the reinforced-fabric housing portion 15a is recessed on the molding surface 15 on the inside of the parting surface 16. The back-side reinforced fabric 4 is housed in the reinforced-fabric housing portion 15a such that the peripheral edge side is in contact with the bottom portion of the reinforced-fabric housing portion 15a while the center side faces the inside of the molding die 10. Accordingly, the non-impregnated layer 4c (see FIG. 1C) over the whole circumference of the peripheral edge on the back side of the inner pad 2 from the peripheral edge toward the inside is formed equivalently to an area corresponding to the gap formed between the inner edge of the parting surface 16 and the outer edge of the folded back-side reinforced fabric 4. While the non-impregnated layer 4c is a flexible portion with a hardness lower than those of the impregnated layers 4a and 4b, the width of the non-impregnated layer 4c is considerably smaller than those of the regions of the impregnated layers 4a and 4b. This does not cause a problem of ripping of the non-impregnated layer 4c or breakage of the inner pad 2.

Figure 5A:
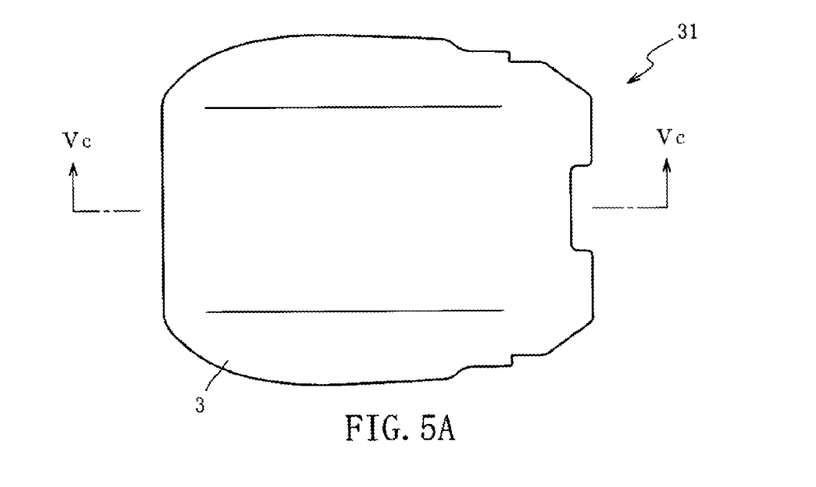
FIG. 5A is a top view of a seat pad in a second embodiment.
Figure 5B:
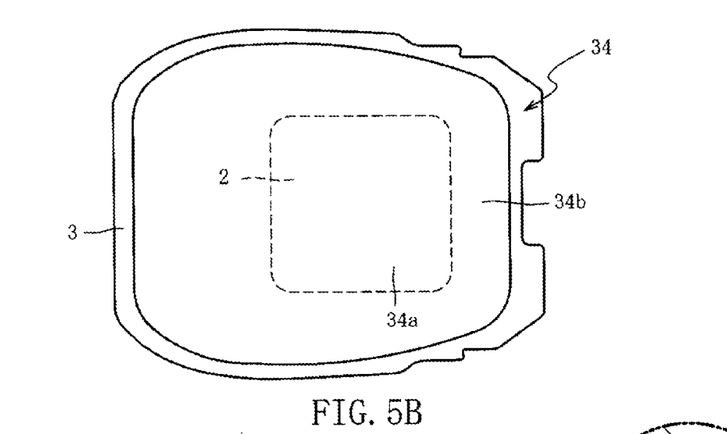
FIG. 5B is a back view of the seat pad.
Figure 5C:
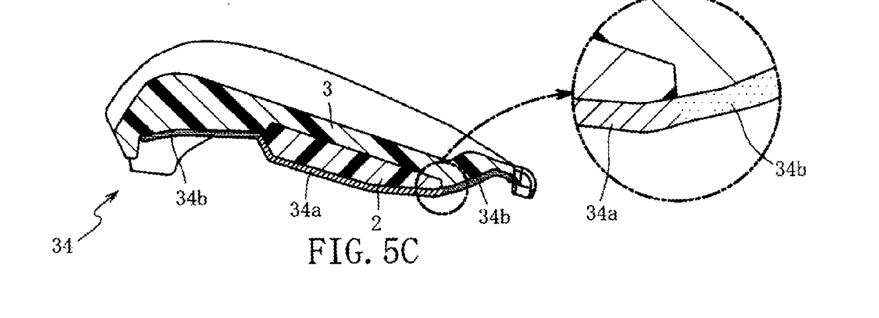
FIG. 5C is a cross-sectional view of the seat pad taken along the line Vc-Vc in FIG. 5A.

The following describes a seat pad 31 in a second embodiment with reference to FIGS. 5A-C. In the first embodiment, the description has been given of the case where the non-impregnated layer 4c is formed in the back-side reinforced fabric 4 between the impregnated layers 4a and 4b. In contrast, in the second embodiment, a description will be given of the case where the non-impregnated layer is not formed in the back-side reinforced fabric 34. Here, like reference numerals designate corresponding or identical elements in the first embodiment and the second embodiment, and therefore such elements will not be further elaborated or simplified here. FIG. 5A is a top view of the seat pad 31 in the second embodiment. FIG. 5B is a back view of the seat pad 31. FIG. 5C is a cross-sectional view of the seat pad 31 taken along the line Vc-Vc in FIG. 5A.

The seat pad 31 is a flexible pad arranged between a seat spring and an epidermis material (neither of which is illustrated), and constitutes a cushion pad on which an occupant sits. The seat pad 31 is constituted to include the inner pad 2 made of foamed synthetic resin, the pad main body 3 made of foamed synthetic resin, and a back-side reinforced fabric 34 such as a nonwoven fabric. The inner pad 2 is formed in approximately a rectangular shape in a back view. The pad main body 3 is arranged to cover the front side (the upper side in FIG. 5C) of the inner pad 2. The back-side reinforced fabric 34 is arranged on the back side of the pad main body 3 and the inner pad 2.

The back-side reinforced fabric 34 is a sheet material formed of a nonwoven fabric (such as a hair felt) or similar material. As illustrated in FIG. 5C, in the back-side reinforced fabric 34, an impregnated layer 34a and an impregnated layer 34b are formed. In the impregnated layer 34a, a foamed synthetic resin material (liquid raw material) constituting the inner pad 2 is impregnated and hardened. In the impregnated layer 34b, a foamed synthetic resin material (liquid raw material) constituting the pad main body 3 is impregnated and hardened.

The impregnated layer 34a is a portion where the back-side reinforced fabric 34 is integrally bonded on the back side of the inner pad 2. The impregnated layer 34b is a portion where the back-side reinforced fabric 34 is integrally bonded on the back side of the pad main body 3. The impregnated layers 34a and 34b have high hardnesses due to hardening of the foamed synthetic resin materials. Accordingly, the impregnated layers 34a and 34b are preferred as receiving members for the seat spring and the seat component (neither of which is illustrated). The impregnated layers 34a and 34b are formed on the back side of the inner pad 2 and the pad main body 3. This allows providing a high hardness on the back side of the inner pad 2 while ensuring hardness on the back side of the pad main body 3.

Figure 6A:
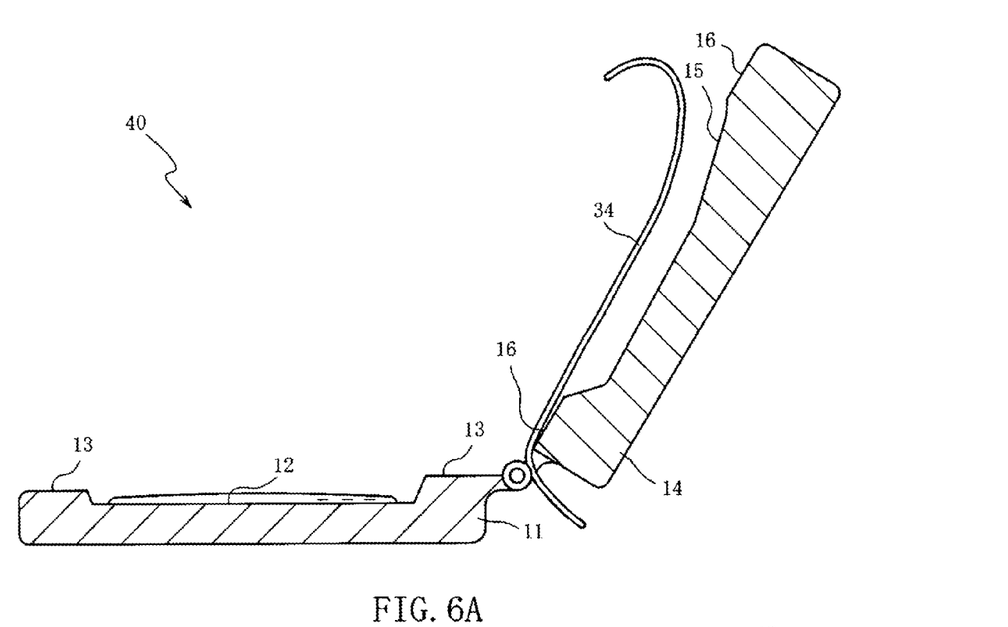
FIG. 6A is a cross-sectional view of a molding die for an inner pad where the inner pad is to be foam molded in a state where the die is opened.
Figure 6B:
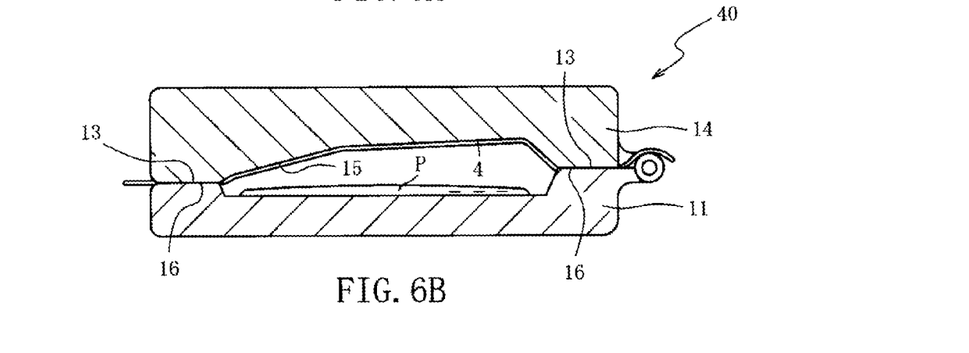
FIG. 6B is a cross-sectional view of the molding die for the inner pad in a state where the die is closed.
Figure 6C:
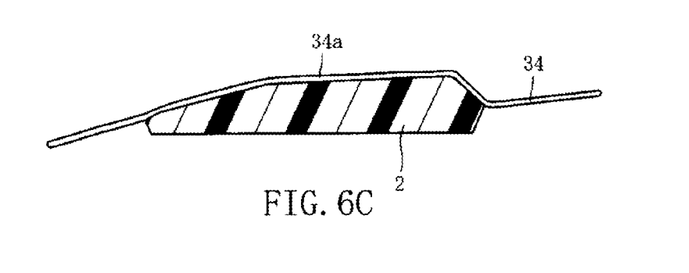
FIG. 6C is a cross-sectional view of the inner pad foam molded integrally with a back-side reinforced fabric.

The following describes a method for manufacturing the seat pad 31 with reference to FIGS. 6A-C to FIG. 7. Firstly, a description will be given of a molding die 40 where the inner pad 2 is foam molded and the method for manufacturing the inner pad 2 with reference to FIGS. 6A-C. FIG. 6A is a cross-sectional view of the molding die 40 for the inner pad 2 where the inner pad 2 is foam molded in a state where the die is opened. FIG. 6B is a cross-sectional view of the molding die 40 for the inner pad 2 in a state where the die is closed. FIG. 6C is a cross-sectional view of the inner pad 2 foam molded integrally with the back-side reinforced fabric 34. Here, in the molding die 40, the reinforced-fabric housing portion 15a is not formed on the molding surface 15. The molding die 40 is otherwise similar to the molding die 10 described in the first embodiment. Accordingly, like reference numerals designate corresponding or identical elements in the first embodiment and the second embodiment, and therefore such elements will not be further elaborated or simplified here.

When the seat pad 31 is manufactured, firstly, the inner pad 2 is foam molded using the molding die 40. In this case, in a state where the upper die 14 is opened with respect to the lower die 11, the back-side reinforced fabric 34 is mounted on the molding surface 15 of the upper die 14. Here, the back-side reinforced fabric 34 is set to be larger than the size of the inner pad 2 in a back view, and is set to have the size approximately same as the size of the pad main body 3 (see FIG. 5B) in a back view. The back-side reinforced fabric 34 is set to be larger than the size of the molding surface 15. Accordingly, in a state where the peripheral edge side is expanded to the outside of the molding surface 15, the back-side reinforced fabric 34 is mounted on the molding surface 15.

Subsequently, as illustrated in FIG. 6B, the foamed synthetic resin material P (liquid raw material), which is a raw material of the inner pad 2, is injected into the lower die 11. The parting surfaces 13 and 16 are matched for closing the dies so as to interpose the back-side reinforced fabric 34 between the parting surfaces 13 and 16. The foamed synthetic resin material P is foamed and then cured for a predetermined time. Then, the dies are opened to demold the molded inner pad 2. As a result, as illustrated in FIG. 6C, the impregnated layer 34a by impregnating and hardening the foamed synthetic resin material in the back-side reinforced fabric 34 is formed. The impregnated layer 34a integrally bonds the back-side reinforced fabric 34 on the back side of the inner pad 2.

Figure 7:
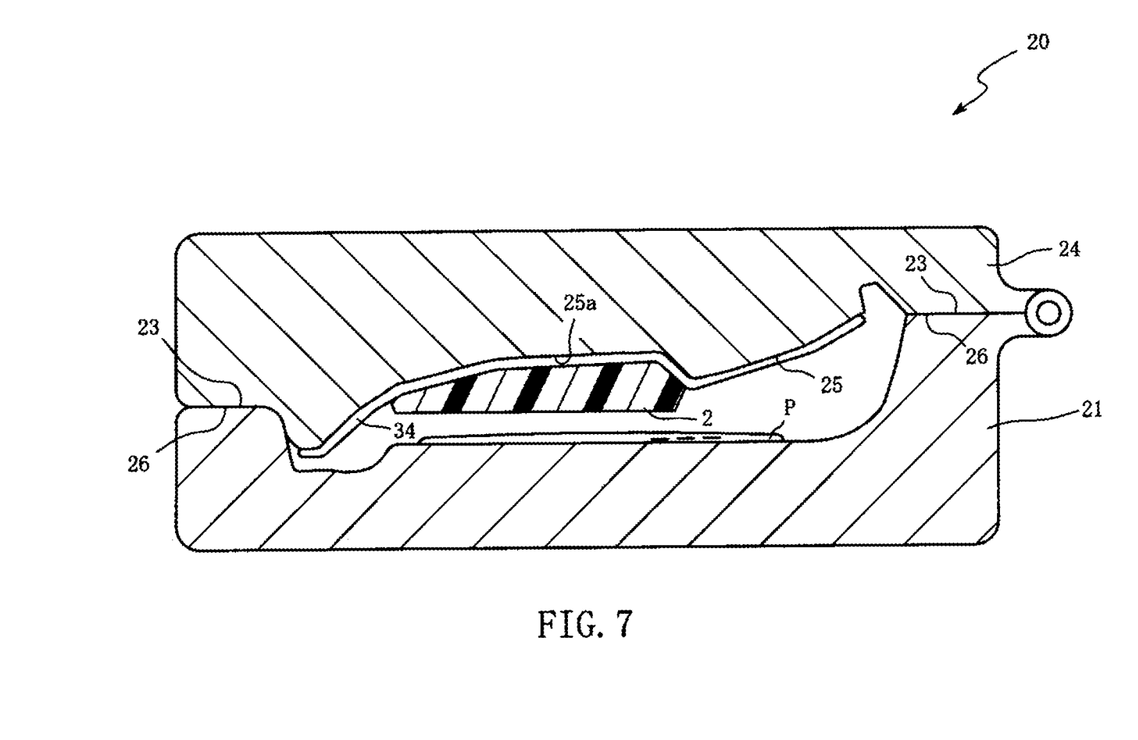
FIG. 7 is a cross-sectional view of a molding die for a pad main body in a state where the die is closed.

The following describes a method for manufacturing the pad main body 3 with reference to FIG. 7. FIG. 7 is a cross-sectional view of the molding die 20 for the pad main body 3 in a state where the die is closed. When the pad main body 3 is molded, firstly, in a state where the upper die 24 is opened with respect to the lower die 21, the inner pad 2 bonded integrally with the back-side reinforced fabric 34 is mounted on the inner-pad securing portion 25a formed in the upper die 24. At this time, the back-side reinforced fabric 34 is mounted on the molding surface 25 of the upper die 24. The inner pad 2 is disposed on the inside of the molding die 20 with respect to the back-side reinforced fabric 34.

Subsequently, the foamed synthetic resin material P (liquid raw material), which is a raw material of the pad main body 3, is injected into the lower die 21. After the parting surfaces 23 and 26 are matched for closing the dies, the foamed synthetic resin material P is foam molded. After curing for a predetermined time, the dies are opened to demold the pad main body 3 molded integrally with the inner pad 2. In the seat pad 31, the impregnated layer 34b by impregnating and hardening the foamed synthetic resin material in the back-side reinforced fabric 34 (see FIG. 5C) is formed. The impregnated layer 34b integrally bonds the back-side reinforced fabric 34 on the back side of the pad main body 3. Accordingly, the back-side reinforced fabric 34 can also be bonded on the back side of the pad main body 3. This consequently allows providing a high hardness on the back side of the inner pad 2 while ensuring hardness on the back side of the pad main body 3.

When the inner pad 2 is foam molded, the back-side reinforced fabric 34 is sandwiched between the parting surfaces 13 and 16 of the upper die 14 and the lower die 11. When the pad main body 3 is foam molded, the back-side reinforced fabric 34 and the inner pad 2 are mounted within the molding die 20. As a result, one sheet of the back-side reinforced fabric 34 sandwiched between the parting surfaces 13 and 16 is bonded on the back side of the inner pad 2 and the pad main body 3. This allows reducing the product cost compared with the case where a plurality of the back-side reinforced fabrics is used.

Furthermore, the raw material of the foamed inner pad 2 is impregnated in the central portion of the back-side reinforced fabric 34 located on the inside of the parting surfaces 13 and 16 but cannot be impregnated on the peripheral edge side of the back-side reinforced fabric 34 on the outside of the parting surfaces 13 and 16. This allows preventing the peripheral edge side of the back-side reinforced fabric 34 from being bonded on the back side of the inner pad 2.

If the peripheral edge side of the back-side reinforced fabric 34 is bonded on the back side of the inner pad 2 when the inner pad 2 is foam molded integrally with the back-side reinforced fabric 34, there occurs the need for ripping the peripheral edge side of the back-side reinforced fabric 34 from the back side of the inner pad 2 before the back-side reinforced fabric 34 and the inner pad 2 are mounted on the upper die 14. In this case, the working efficiency of the mounting operation of the back-side reinforced fabric 34 and the inner pad 2 on the upper die 14 is reduced. However, sandwiching the back-side reinforced fabric 34 between the parting surfaces 13 and 16 can avoid bonding of the peripheral edge side of the back-side reinforced fabric 34 on the back side of the inner pad 2. This allows ensuring the working efficiency of the mounting operation of the back-side reinforced fabric 34 and the inner pad 2 on the upper die 14.

Here, when the inner pad 2 is foam molded, the back-side reinforced fabric 34 is sandwiched between the parting surfaces 13 and 16 of the upper die 14 and the lower die 11. Thus, the impregnated layer 34a can be formed by impregnating the foamed synthetic resin material in the back-side reinforced fabric 34 on the inside of the parting surfaces 13 and 16. When the pad main body 3 is foam molded, the impregnated layer 34b can be formed by impregnating the foamed synthetic resin material in the back-side reinforced fabric 34 on the outside of the impregnated layer 34a. This can avoid formation of the flexible non-impregnated layer between the impregnated layer 34a and the impregnated layer 34b, thus providing a high hardness on the back side of the inner pad 2 and the pad main body 3 including the boundary portion between the inner pad 2 and the pad main body 3.

As described above, the present invention has been described based on the above-mentioned embodiments. It will be appreciated that the present invention will not be limited to the embodiments described above, but various modifications are possible without departing from the technical scope of the present invention. For example, the shapes described in the above-mentioned embodiments are examples. Other shapes are obviously possible.

In the above-described respective embodiments, the description has been given of the cases of the seat pads 1 and 31 in which the inner pad 2 is arranged under the seated person's bottom. This should not necessarily be construed in a limiting sense. The inner pad 2 can obviously be arranged under the thigh portion or in the side portion of the seated person.

In the above-described respective embodiments, the seat pads 1 and 31 constituting the cushion pad have been described. This should not necessarily be construed in a limiting sense. Application to another seat pad such as a seat pad constituting a back pad is obviously possible.

In the above-described respective embodiments, the description has been given of the cases where the hardness of the inner pad 2 is set to be higher than the hardness of the pad main body 3 as the inner pad 2 and the pad main body 3, which are set to have mutually different characteristics. This should not necessarily be construed in a limiting sense. Another characteristic other than the hardness can obviously be set to be different. As the other characteristic, for example, a dynamic characteristic such as a coefficient of restitution and a hysteresis loss is possible.

In the above-described respective embodiments, the description has been given of the seat pads 1 and 31 in which the pad main body 3 covers the front side of one inner pad 2. This should not necessarily be construed in a limiting sense. Application to a seat pad where one pad main body 3 covers the front side of two or more inner pads 2 is obviously possible.

In the above-described respective embodiments, the description has been given of the cases where the back-side reinforced fabrics 4 and 34 are constituted by nonwoven fabrics such as hair felt. This should not necessarily be construed in a limiting sense. The back-side reinforced fabrics 4 and 34 need not be nonwoven fabrics insofar as the back-side reinforced fabrics 4 and 34 are sheet materials where impregnated layers by impregnating and hardening foamed synthetic resin materials (liquid raw materials) of flexible foam are formed. Additionally, it is obviously possible to use a laminated sheet (for example, a laminated sheet in which a layer formed of fiber material for receiving a seat component such as a spring, a barrier layer for blocking the impregnation of the liquid raw material, and a nonwoven fabric are laminated) with a plurality of layers including a nonwoven fabric.

While in the above-described first embodiment the description has been given of the case where the reinforced-fabric housing portion 15a is recessed on the molding surface 15 of the upper die 14 in the molding die 10, the reinforced-fabric housing portion 15a is not necessarily required. In the case where the thickness of the folded back-side reinforced fabric 4 and the thickness of the back-side reinforced fabric 4 where the fold is opened are not much different from each other, for example, in the case where the thickness of the back-side reinforced fabric 4 is small, it is obviously possible to mount the back-side reinforced fabric 4 on the molding surface 15 of the upper die 14 in a folded state without disposing the reinforced-fabric housing portion 15a.

A seat pad of another technical idea includes an inner pad made of foamed synthetic resin, a pad main body made of foamed synthetic resin, and a back-side reinforced fabric. The pad main body is set to have a characteristic different from a characteristic of the inner pad, and is bonded integrally with the inner pad while covering the front side of the inner pad. The back-side reinforced fabric is arranged on the back side of the pad main body and the inner pad. In the seat pad, the back-side reinforced fabric is integrally bonded on the back side of the inner pad and the pad main body by impregnation of foamed synthetic resin materials that constitute the inner pad and the pad main body.

This allows impregnation of the foamed synthetic resin materials in the back-side reinforced fabric located on the back side of the inner pad and the pad main body. This consequently provides an effect that allows providing a high hardness on the back side of the inner pad while ensuring hardness on the back side of the pad main body.

The invention claimed is:

1. A method for manufacturing a seat pad, the seat pad including: an inner pad made of foamed synthetic resin; a pad main body made of foamed synthetic resin, the pad main body being set to have a characteristic different from a characteristic of the inner pad, the pad main body being bonded integrally with the inner pad while covering a front side of the inner pad; and a back-side reinforced fabric arranged on a back side of the pad main body and the inner pad, the method comprising:
   a reinforced-fabric mounting step of mounting the back-side reinforced fabric within a molding die where the inner pad is to be foam molded;
   an inner-pad molding step of foam molding the inner pad integrally with the back-side reinforced fabric mounted by the reinforced-fabric mounting step;
   an inner-pad mounting step of mounting the inner pad and the back-side reinforced fabric within a molding die where the pad main body is to be foam molded, the inner pad and the back-side reinforced fabric being integrally foam molded by the inner-pad molding step; and
   a pad-main-body molding step of foam molding the pad main body integrally with the inner pad and the back-side reinforced fabric, the inner pad and the back-side reinforced fabric being mounted by the inner-pad mounting step;

wherein the molding die where the inner pad is to be foam molded includes: a lower die where a molding surface for molding the front side of the inner pad is formed; and an upper die where a molding surface for molding the back side of the inner pad is formed, the upper die being configured to seal the lower die, the reinforced-fabric mounting step mounts the back-side reinforced fabric in the folded state on the molding surface of the upper die on an inside of parting surfaces of the upper die and the lower die, and the inner-pad mounting step mounts the back-side reinforced fabric and the inner pad in a state where the fold is opened within the molding die where the pad main body is to be foam molded.

2. The method for manufacturing the seat pad according to claim 1, wherein the molding die where the inner pad is to be foam molded includes a reinforced-fabric housing portion recessed on the molding surface of the upper die, and the reinforced-fabric housing portion houses the back-side reinforced fabric in a folded state.

* * * * *